US012087273B2

(12) United States Patent
Zhang et al.

(10) Patent No.: US 12,087,273 B2
(45) **Date of Patent: *Sep. 10, 2024**

(54) MULTILINGUAL SPEECH SYNTHESIS AND CROSS-LANGUAGE VOICE CLONING

(71) Applicant: Google LLC, Mountain View, CA (US)

(72) Inventors: Yu Zhang, Mountain View, CA (US); Ron J. Weiss, New York, NY (US); Byungha Chun, Tokyo (JP); Yonghui Wu, Fremont, CA (US); Zhifeng Chen, Sunnyvale, CA (US); Russell John Wyatt Skerry-Ryan, Mountain View, CA (US); Ye Jia, Mountain View, CA (US); Andrew M. Rosenberg, Brooklyn, NY (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,217

(22) Filed: Jan. 30, 2023

(65) Prior Publication Data

US 2023/0178068 A1 Jun. 8, 2023

Related U.S. Application Data

(63) Continuation of application No. 16/855,042, filed on Apr. 22, 2020, now Pat. No. 11,580,952.

(Continued)

(51) Int. Cl.

| | |
|---|---|
| ***G10L 21/00*** | (2013.01) |
| ***G10L 13/00*** | (2006.01) |
| ***G10L 13/047*** | (2013.01) |

(52) U.S. Cl.

CPC .................................. *G10L 13/047* (2013.01)

(58) Field of Classification Search

None

See application file for complete search history.

(56) References Cited

U.S. PATENT DOCUMENTS

| | | | | |
|---|---|---|---|---|
| 11,580,952 B2 * | 2/2023 | Zhang | ..................... | G10L 13/08 |
| 2010/0191533 A1 * | 7/2010 | Toiyama | ................. | G10L 13/08 704/260 |

(Continued)

FOREIGN PATENT DOCUMENTS

| | | |
|---|---|---|
| AU | 2018244917 A1 | 10/2019 |
| AU | 2020201421 A1 | 3/2020 |

(Continued)

OTHER PUBLICATIONS

International Search Report for the related Application No. PCT/US2020/029239.

(Continued)

*Primary Examiner* — Shreyans A Patel

(74) *Attorney, Agent, or Firm* — Honigman LLP; Brett A. Krueger; Grant Griffith

(57) ABSTRACT

A method includes receiving an input text sequence to be synthesized into speech in a first language and obtaining a speaker embedding, the speaker embedding specifying specific voice characteristics of a target speaker for synthesizing the input text sequence into speech that clones a voice of the target speaker. The target speaker includes a native speaker of a second language different than the first language. The method also includes generating, using a text-to-speech (TTS) model, an output audio feature representation of the input text by processing the input text sequence and the speaker embedding. The output audio feature representation includes the voice characteristics of the target speaker specified by the speaker embedding.

22 Claims, 4 Drawing Sheets

Related U.S. Application Data

(60) Provisional application No. 62/855,067, filed on May 31, 2019.

(56) References Cited

U.S. PATENT DOCUMENTS

| | | | | |
|---|---|---|---|---|
| 2012/0253781 | A1* | 10/2012 | Qian | G10L 21/003 704/2 |
| 2015/0134322 | A1* | 5/2015 | Cuthbert | G06F 40/58 704/3 |
| 2015/0288797 | A1* | 10/2015 | Vincent | G16H 10/60 455/404.2 |
| 2016/0012035 | A1* | 1/2016 | Tachibana | G10L 13/00 704/10 |
| 2016/0147740 | A1* | 5/2016 | Gao | G10L 15/063 704/2 |
| 2018/0268806 | A1* | 9/2018 | Chun | G10L 13/027 |
| 2019/0122651 | A1* | 4/2019 | Arik | G10L 13/08 |
| 2019/0311708 | A1 | 10/2019 | Bengio et al. | |
| 2020/0051583 | A1* | 2/2020 | Wu | G10L 13/047 |
| 2020/0082806 | A1 | 3/2020 | Kim et al. | |
| 2020/0098350 | A1 | 3/2020 | Bengio et al. | |
| 2020/0111474 | A1* | 4/2020 | Kumar | G10L 15/19 |
| 2021/0020161 | A1* | 1/2021 | Gao | G10L 13/08 |

FOREIGN PATENT DOCUMENTS

| | | | |
|---|---|---|---|
| CA | 3058433 | A1 | 10/2018 |
| CN | 110476206 | A | 11/2019 |
| EP | 3583594 | A2 | 12/2019 |
| JP | 2020515899 | A | 5/2020 |
| KR | 20190130634 | A | 11/2019 |
| WO | 2018183650 | A2 | 10/2018 |

OTHER PUBLICATIONS

Cao Yuewen et al: "End-to-end Code-switched TTS with Mix of Monolingual Recordings", ICASSP 2019—2019 Eee International Conference on Acoustics, Speech and Signal Processing (ICASSP), IEEE, May 12, 2019 (May 12, 2019), pp. 6935-6939, XP033565504, DOI: 10.1109/ICASSP.2019. 8682927 [retrieved on Apr. 4, 2019].

Fan Yuchen et al: "Speaker and language factorization in DNN-based TTS synthesis", 2016 IEEE International Conference on Acoustics, Speech and Signal Processing (ICASSP), IEEE, Mar. 20, 2016 (Mar. 20, 2016), pp. 5540-5544, XP032901663, DOI: 10.1109/ICASSP.2016.7472737 [retrieved on May 18, 2016].

Yu Zhang et al: "Learning to Speak Fluently in a Foreign Language: Multilingual Speech Synthesis and Cross-Language Voice Cloning", arxiv.org, Cornell University Library, 201 Olin Library Cornell University Ithaca, NY 14853, Jul. 10, 2019 (Jul. 10, 2019), XP081440090, abstract; figure 1 secti ons 1-3.

Japanese Office Action for the related application No. 2021-570996 dated Nov. 25, 2022.

USPTO. Office Action relating to U.S. Appl. No. 16/855,042, dated Jun. 6, 2022.

* cited by examiner

MULTILINGUAL SPEECH SYNTHESIS AND CROSS-LANGUAGE VOICE CLONING

CROSS REFERENCE TO RELATED APPLICATIONS

This U.S. patent application is a continuation of, and claims priority under 35 U.S.C. § 120 from, U.S. patent application Ser. No. 16/855,042, filed on Apr. 22, 2020, which claims priority under 35 U.S.C. § 119(e) to U.S. Provisional Application 62/855,067, filed on May 31, 2019. The disclosures of these prior applications are considered part of the disclosure of this application and are hereby incorporated by reference in their entireties.

TECHNICAL FIELD

This disclosure relates to multilingual speech synthesis and cross-language voice cloning.

BACKGROUND

Recent end-to-end (E2E) neural text-to-speech (TTS) models enable control of speaker identify as well as unlabeled speech attributes, e.g., prosody, by conditioning speech synthesis on latent representation in addition to text. Extending these TTS models to support multiple, unrelated languages is nontrivial when using language-dependent input representations or model components, especially when an amount of training data per language is imbalanced.

By way of example, there may be little or no overlap in text representations between some languages, such as Mandarin and English. Because recordings from bilingual speakers are expensive to collect, in the common case where each speaker in the training set speaks only one language, speaker identity is perfectly correlated with language. This makes it difficult to transfer voices across different languages, which is a desirable feature particularly when the number of available training voices for a particular language is small. Moreover, for languages with borrowed or shared words, such as proper nouns in Spanish (ES) and English (EN), pronunciations of the same text might be different. This adds more ambiguity when a naively trained model sometimes generates accented speech for a particular speaker.

SUMMARY

One aspect of the disclosure provides a method for synthesizing speech from an input text sequence. The method includes receiving, at data processing hardware, an input text sequence to be synthesized into speech in a first language; and obtaining, by the data processing hardware, a speaker embedding specifying specific voice characteristics of a target speaker for synthesizing the input text sequence into speech that clones a voice of the target speaker. The target speaker includes a native speaker of a second language different than the first language. The method also includes generating, by the data processing hardware, using a text-to-speech (TTS) model, an output audio feature representation of the input text sequence by processing the input text sequence and the speaker embedding. The output audio feature representation includes the voice characteristics of the target speaker specified by the speaker embedding.

Implementations of the disclosure may include one or more of the following optional features. In some implementations, the method also includes obtaining, by the data processing hardware, a language embedding specifying language-dependent information. In these implementations, processing the input text and the speaker embedding further includes processing the input text, the speaker embedding, and the language embedding to generate the output audio feature representation of the input text, the output audio feature representation further having the language-dependent information specified by the language embedding. The language-dependent information may be associated with the second language of the target speaker, and the language embedding specifying the language-dependent information may be obtained from training utterances spoken in the second language by one or more different speakers. In other examples, the language-dependent information may be associated with the first language, and the language embedding specifying the language-dependent information may be obtained from training utterances spoken in the first language by one or more different speakers.

In some examples, generating the output audio feature representation of the input text includes, for each of a plurality of time steps: processing, using an encoder neural network, a respective portion of the input text sequence for the time step to generate a corresponding text encoding for the time step; and processing, using a decoder neural network, the text encoding for the time step to generate a corresponding output audio feature representation for the time step. Here, the encoder neural network may include a convolutional subnetwork and a bidirectional long short-term memory (LSTM) layer. Additionally, the decoder neural network may include autoregressive neural network that includes a long short-term memory (LTSM) subnetwork, a linear transform, and a convolutional subnetwork.

The output audio feature representation may include mel-frequency spectrograms. In some implementations, the method also includes inverting, by the data processing hardware, using a waveform synthesizer, the output audio feature representation into a time-domain waveform; and generating, by the data processing hardware, using the time-domain waveform, a synthesized speech representation of the input text sequence that clones the voice of the target speaker in the first language.

The TTS model may be trained on a first language training set and second language training set. The first language training set includes a plurality of utterances spoken in the first language and corresponding reference text, and the second language training set includes a plurality of utterance spoken in the second language and corresponding reference text. In additional examples, the TTS model is further trained on one or more additional language training sets, each additional language training set of the one or more additional language training sets including a plurality of utterances spoken in a respective language and corresponding reference text. Here, the respective language of each additional language training set is different than the respective language of each other additional language training set and different than the first and second languages.

The input text sequence may correspond to a character input representation or a phoneme input representation. Optionally, the input text sequence may correspond to an 8-bit Unicode Transformation Format (UTF-8) encoding sequence.

Another aspect of the disclosure provides a system for synthesizing speech from an input text sequence. The system includes data processing hardware and memory hardware in communication with the data processing hardware and storing instructions that when executed by the data processing hardware cause the data processing hardware to perform operations. The operations include receiving an input text sequence to be synthesized into speech in a first language and obtaining a speaker embedding specifying specific voice characteristics of a target speaker for synthesizing the input text sequence into speech that clones a voice of the target speaker. The target speaker includes a native speaker of a second language different than the first language. The operations also include generating, using a text-to-speech (TTS) model, an output audio feature representation of the input text sequence by processing the input text sequence and the speaker embedding. The output audio feature representation includes the voice characteristics of the target speaker specified by the speaker embedding.

This aspect may include one or more of the following optional features. In some implementations, the operations also include obtaining a language embedding specifying language-dependent information. In these implementations, processing the input text and the speaker embedding further includes processing the input text, the speaker embedding, and the language embedding to generate the output audio feature representation of the input text, the output audio feature representation further having the language-dependent information specified by the language embedding. The language-dependent information may be associated with the second language of the target speaker, and the language embedding specifying the language-dependent information may be obtained from training utterances spoken in the second language by one or more different speakers. In other examples, the language-dependent information may be associated with the first language, and the language embedding specifying the language-dependent information may be obtained from training utterances spoken in the first language by one or more different speakers.

In some examples, generating the output audio feature representation of the input text includes, for each of a plurality of time steps: processing, using an encoder neural network, a respective portion of the input text sequence for the time step to generate a corresponding text encoding for the time step; and processing, using a decoder neural network, the text encoding for the time step to generate a corresponding output audio feature representation for the time step. Here, the encoder neural network may include a convolutional subnetwork and a bidirectional long short-term memory (LSTM) layer. Additionally, the decoder neural network may include autoregressive neural network that includes a long short-term memory (LTSM) subnetwork, a linear transform, and a convolutional subnetwork.

The output audio feature representation may include mel-frequency spectrograms. In some implementations, the operations also include inverting, using a waveform synthesizer, the output audio feature representation into a time-domain waveform; and generating, using the time-domain waveform, a synthesized speech representation of the input text sequence that clones the voice of the target speaker in the first language.

The TTS model may be trained on a first language training set and second language training set. The first language training set includes a plurality of utterances spoken in the first language and corresponding reference text, and the second language training set includes a plurality of utterance spoken in the second language and corresponding reference text. In additional examples, the TTS model is further trained on one or more additional language training sets, each additional language training set of the one or more additional language training sets including a plurality of utterances spoken in a respective language and corresponding reference text. Here, the respective language of each additional language training set is different than the respective language of each other additional language training set and different than the first and second languages.

The input text sequence may correspond to a character input representation or a phoneme input representation. Optionally, the input text sequence may correspond to an 8-bit Unicode Transformation Format (UTF-8) encoding sequence.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Implementations wherein are directed toward enhancing an end-to-end (E2E) text-to-speech (TTS) model as a multispeaker, multilingual TTS model capable of producing high quality speech in multiple languages. Particularly, the model is able to receive input text of a phrase in a first native language and produce synthesized speech of the phrase in a second native language different than the first native language. Further, the TTS model is able to transfer voices across different native languages by using a voice of a first native language (e.g., English) speaker to synthesize fluent speech in a second native language (e.g., Spanish) without requiring the training of the TTS model on any bilingual or parallel training examples. Notably, the TTS model is capable of voice transfer across distantly related (e.g., little or no overlap) languages, such as English and Mandarin.

Figure 1:
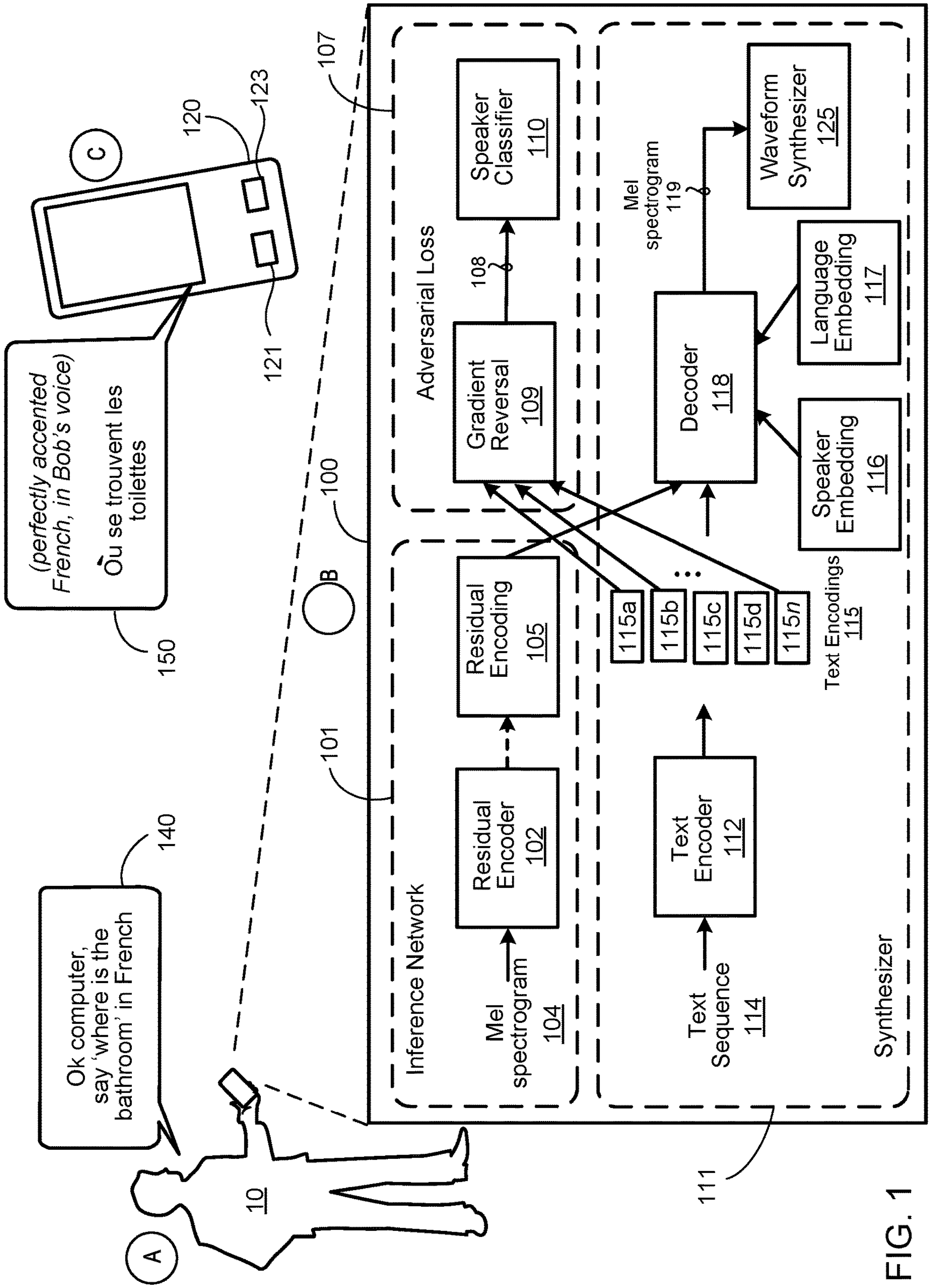
FIG. 1 is a schematic view of an enhanced text-to-speech (TTS) model capable of producing high quality speech in multiple languages.

Referring to FIG. 1, in some implementations, a multi-speaker, multilingual TTS model 100 includes an inference network 101, an adversarial loss module 107, and a synthesizer 111. The inference network 101 includes a residual encoder 102 that is configured to consume input audio features 104 corresponding to a speech utterance and output a residual encoding component 105 of the audio features 104. The audio features 104 may include input mel spectrogram representations. The synthesizer 111 includes a text encoder 112, a speaker embedding module 116, a language embedding module 117, and a decoder neural network 118. The text encoder 112 may include an encoder neural network having a convolutional subnetwork and a bidirectional long short-term memory (LSTM) layer. The decoder neural network 118 is configured to receive, as input, outputs 115, **116*a*, 117*a* from the text encoder 112, the speaker embedding module 116, and the language embedding module 117 to generate an output mel spectrogram 119. Finally, a waveform synthesizer 125** may invert the mel spectrograms 119 output from the decoder neural network 118 into a time-domain waveform 126 of a verbal utterance of an input text sequence in a particular natural language, i.e., a synthesized speech representation of an input text sequence 114. In some implementations, the waveform synthesizer is a Griffin-Lim synthesizer. In some other implementations, the waveform synthesizer is a vocoder. For instance, the waveform synthesizer 125 may include a WaveRNN vocoder. Here, the WaveRNN vocoder 125 may generate 16-bit signals sampled at 24 kHz conditioned on spectrograms predicted by the TTS model 100. In some other implementations, the waveform synthesizer is a trainable spectrogram to waveform inverter. After the waveform synthesizer 125 generates the waveform, an audio output system can generate the speech 150 using the waveform 126 and provide the generated speech 150 for playback, e.g., on a user device, or provide the generated waveform 126 to another system to allow the other system to generate and play back the speech. In some examples, a WaveNet neural vocoder replaces the waveform synthesizer 125. A WaveNet neural vocoder may provide different audio fidelity of synthesized speech in comparison to synthesized speech produced by the waveform synthesizer 125.

The text encoder 112 is configured to encode an input text sequence 114 into a sequence of text encodings 115, 115*a-n*. In some implementations, the text encoder 112 includes an attention network that is configured to receive a sequential feature representation of the input text sequence to generate a corresponding text encoding as a fixed-length context vector for each output step of the decoder neural network 118. That is, the attention network at the text encoder 112 may generate a fixed-length context vector 115, 115*a-n* for each frame of a mel-frequency spectrogram 119 that the decoder neural network 118 will later generate. A frame is a unit of the mel-frequency spectrogram 118 that is based on a small portion of the input signal, e.g., a 10 millisecond sample of the input signal. The attention network may determine a weight for each element of the encoder output and generates the fixed-length context vector 115 by determining a weighted sum of each element. The attention weights may change for each decoder time step.

Accordingly, the decoder neural network 118 is configured to receive as input the fixed-length context vectors (e.g., text encodings) 115 and generate as output a corresponding frame of a mel-frequency spectrogram 119. The mel-frequency spectrogram 119 is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity.

In some implementations, the decoder neural network 118 includes an attention-based sequence-to-sequence model configured to generate a sequence of output log-mel spectogram frames, e.g., output mel spectrogram 119, based on an input text sequence 114. For instance, the decoder neural network 118 may be based on the Tacotron 2 model (See "Natural TTS Synthesis by Conditioning WaveNet on Mel Spectrogram Predictions," by J. Shen, et al., at, e.g., https://arxiv.org/abs/1712.05884, which is incorporated herein by reference). The TTS model 100 provides an enhanced, multilingual TTS model that augments the decoder neural network 118 with additional speaker inputs 116*a* (e.g., a speaker embedding component 116), and optionally, language embedding inputs 117*a* (e.g., language embedding component 117), an adversarially-trained speaker classifier (e.g., speaker classifier component 110), and a variational autoencoder-style residual encoder (e.g., the residual encoder 102).

The enhanced, multilingual TTS model 100, that augments the attention-based sequence-to-sequence decoder neural network 118 with one or more of the speaker classifier component 110, the residual encoder 102, the speaker embedding component 116, and/or the language embedding component 117 notably provides many positive results. Namely, the TTS model 100 enables the use of a phonemic input representation for the input text sequence 114 to encourage sharing of model capacity across different natural languages, and incorporates an adversarial loss term 108 to encourage the model 100 to disentangle how the model 100 represents speaker identify, which perfectly correlates with the language used in the training data, from the speech content. Further training on multiple speakers for each different natural language facilitates to scale up the enhanced, multilingual TTS model 100, and incorporating an auto-encoding input (e.g., residual encoding component) 105 to stabilize attention of the decoder neural network 118 during training, enables the model 100 to consistently synthesize intelligible speech 150 for training speakers 10 in all languages seen during training, and in native or foreign accents.

Notably, the aforementioned conditioning extensions (e.g., components 105 110, 116, 117) applied to the decoder neural network 118 permit training of the model 100 on monolingual speakers to enable high quality speech synthesis in multiple different languages, while permitting the transfer of training voices across the different languages. Additionally, the model 100 learns to speak foreign languages with moderate control of accent, and has support for code switching/mixing. Implementations herein permit scaling up the amount of training data by leveraging large amounts of low quality training data, and supporting many speakers and many languages.

Unlike conventional multilingual TTS systems that rely on Unicode encoding "byte" input representations for training on one speaker of each of multiple different languages, e.g., English, Spanish, and Mandarin, the enhanced, multilingual TTS model 100 evaluates different input representations, scaling up the number of training speakers for each language, and extensions to support cross-lingual voice cloning. Notably, the TTS model 100 trains in a single stage with no language-specific components and obtains naturalness of synthesized speech in a target foreign language. Here, the term "naturalness" of synthesized speech refers to how well the accent of the synthesized speech matches the accent of native speakers of the target natural language. The "naturalness" may be based on a crowdsourced Mean Opinion Score (MOS) evaluations of speech naturalness via a subjective listening test that rates the naturalness of synthesized speech on a rating scale from one (1) to give (5), in 0.5 increments, with a "5" rating evaluating the resulting speech as most natural. Conversely, for cross-language voice cloning, "similarity" of synthesized speech refers to how well the synthesized speech resembles an identity of a reference speaker by pairing each utterance of synthesized speech in the target language with a corresponding reference utterance spoken from the same speaker. Subjective listening tests may also use crowdsourced MOS evaluations of speech similarity to evaluate "similarity" of synthesized speech using the same rate scale from one (1) to give (5), in 0.5 increments, with a "5" rating evaluating the resulting speech as most "similar" to the identity of the reference speaker. Additional details of training on Unicode encoding "byte"

input representations can be found in "Bytes are All You Need: End-to-End Multilingual Speech Recognition and Synthesis with Bytes" by Li et al., found at https://arxiv.org/abs/1811.09021, which is incorporated herein by reference.

Figure 2:
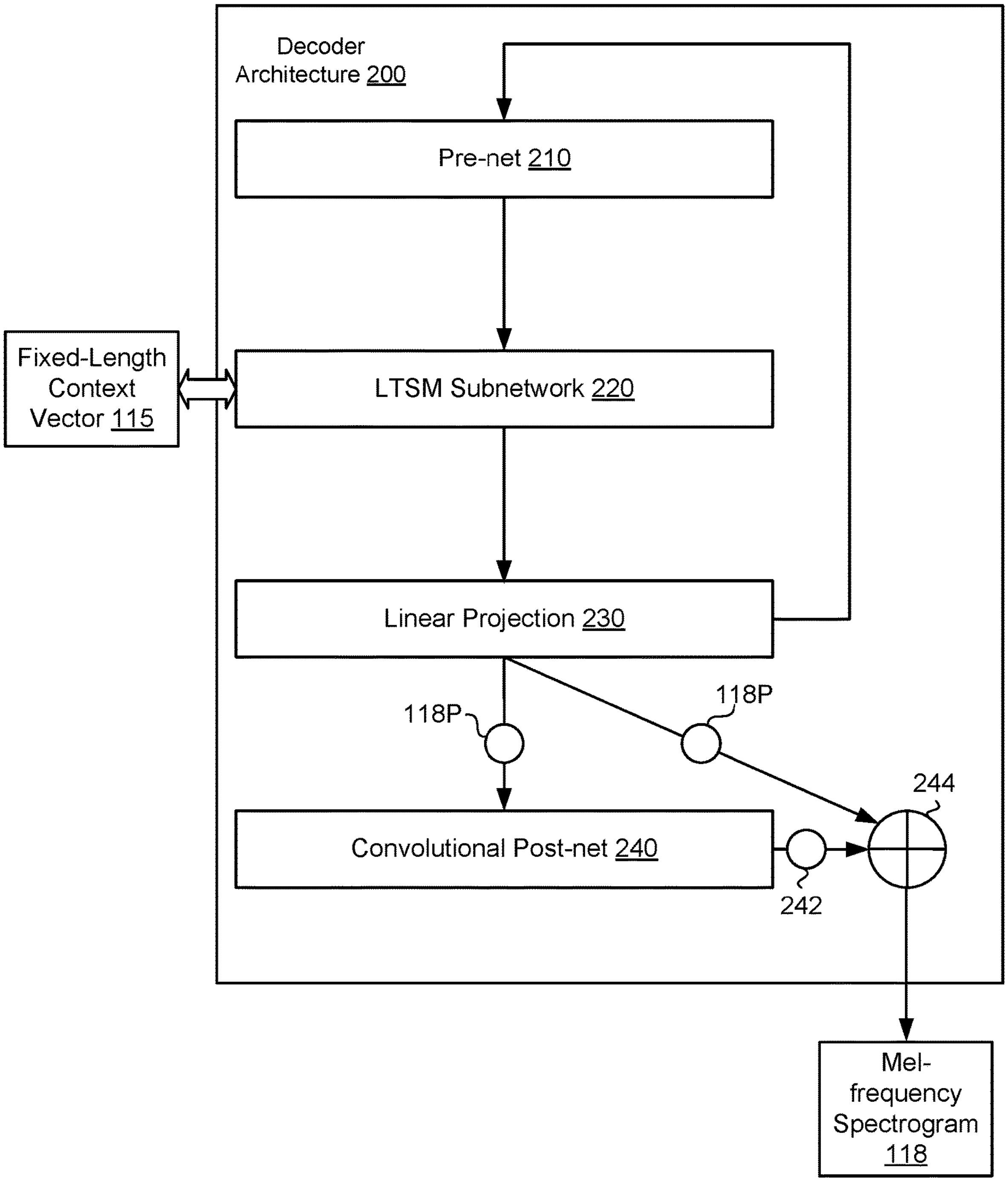
FIG. 2 is a schematic view of an example decoding architecture of a decoding neural network of the TTS model of FIG. 1.

Referring now to FIG. 2, an example decoder architecture 200 for the decoder neural network 118 includes a pre-net 210 through which a mel-frequency spectrogram prediction for a previous time step passes. The pre-net 210 may include two fully-connected layers of hidden ReLUs. The pre-net 210 acts as an information bottleneck for learning attention to increase convergence speed and to improve generalization capability of the speech synthesis system during training. In order to introduce output variation at inference time, dropout with probability 0.5 may be applied to layers in the pre-net.

The decoder architecture 200, in some implementations, also includes a Long Short-Term Memory (LSTM) subnetwork 220 with two or more LSTM layers. At each time step, the LSTM subnetwork 220 receives a concatenation of the output of the pre-net 210 and a fixed-length context vector 202 for the time step. The LSTM layers may be regularized using zoneout with probability of, for example, 0.1. A linear projection 230 receives as input the output of the LSTM subnetwork 220 and produces a prediction of the mel-frequency spectrogram 119P.

In some examples, a convolutional post-net 240 with one or more convolutional layers processes the predicted mel-frequency spectrogram 119P for the time step to predict a residual 242 to add to the predicted mel-frequency spectrogram 119P at adder 244. This improves the overall reconstruction. Each convolutional layer except for the final convolutional layer may be followed by batch normalization and hyperbolic tangent (TanH) activations. The convolutional layers are regularized using dropout with a probability of, for example, 0.5. The residual 242 is added to the predicted mel-frequency spectrogram 119P generated by the linear projection 230, and the sum (i.e., the mel-frequency spectrogram 119) may be provided to the vocoder 125.

In some implementations, in parallel to the decoder neural network 118 predicting mel-frequency spectrograms 119 for each time step, a concatenation of the output of the LSTM subnetwork 220 and the fixed-length context vector 115 (e.g., the text encoding output from the text encoder 112 of FIG. 1) is projected to a scalar and passed through a sigmoid activation to predict the probability that the output sequence of mel frequency spectrograms 119 has completed. This "stop token" prediction is used during inference to allow the model to dynamically determine when to terminate generation instead of always generating for a fixed duration. When the stop token indicates that generation has terminated, i.e., when the stop token probability exceeds a threshold value, the decoder neural network 118 stops predicting mel-frequency spectrograms 119P and returns the mel-frequency spectrograms predicted up to that point. Alternatively, the decoder neural network 118 may always generate mel-frequency spectrograms 119 of the same length (e.g., 10 seconds).

Referring back to FIG. 1, the TTS model 100 is implemented on a computing device 120 of an English-speaking user 10. The user device 120 includes data processing hardware 121 and memory hardware 123 storing instructions that when executed on the data processing hardware 121 cause the data processing hardware 121 to execute an audio subsystem configured to receive spoken inputs 140 from the user 10 and output synthesized speech 150 from the TTS model 110. While the user device 120 includes a mobile device in the example, other examples of the user device 120 include any type of computing device such as a smart phone, a tablet, an Internet-of-Things (IOT) device, a wearable device, a digital assistant device, or a desktop or laptop computer. In other examples, some or all of the components of the TTS model 100 reside on a remote computing device, such as a server of a distributed computing system, in communication with the user device 120.

FIG. 1 also illustrates an example interaction between the user 10 and the user device 120. At stage A, the device 120 captures a spoken input 140 from the user 10 that states, in a first natural language of English, "Okay computer, say 'Where is the bathroom?' in French." The utterance is processed by the TTS model 100 at stage B, and at stage C the TTS model 100 outputs, in perfectly accented French and cloning (e.g., voice transfer) the user's 10 voice, synthesized speech 150 which states, "Où se trouvent les toilettes?" The TTS model 110 is able to transfer the voice of the user 10 into the synthesized speech 150 in French despite the fact that the user 10 does not speak French, and despite the decoder neural network 118 not being trained with any samples of the user 10 speaking utterances in French. In this example, a speech recognizer may convert the spoken input 140 into an input text sequence 114 in the native language French. Here, the speech recognizer may be a multilingual speech recognizer configured to transcribe audio in a first natural language (e.g., English) into corresponding text in a second natural language (e.g., French). Alternatively, the speech recognizer may transcribe the audio into corresponding text in the first native language and a translator may transliterate the text into the input text sequence 114 in the different second natural language.

In some implementations, the residual encoder 102 of the inference network 101 corresponds to a variational autoencoder that encodes latent factors, such as prosody and background noise, from input audio features 104 of a training utterance into the residual encoding component 105. Here, the residual encoding component 105 corresponds to a latent embedding. These latent factors are generally not well represented in conditioning inputs to the decoder neural network 118 during training, whereby the conditioning inputs may include an input text sequence 114 representing the corresponding training utterance, a speaker embedding 116 associated with a speaker of the training utterance, and a language embedding 117 associated with a native language of the training utterance. Accordingly, the residual encoder 102 passes the residual encoding component 105 to the decoder neural network 118 during training to condition the decoder neural network 118 on a latent embedding obtained from the input audio features 104 (e.g., a target input mel spectrogram representation) of the training utterance. During inference, the inference network 101 may simply pass a prior mean (e.g., all zeroes) to the decoder neural network 118 to improve stability of cross-lingual speaker transfer and lead to improved naturalness of the resulting synthesized speech 150.

The TTS model 100 may evaluate the effects of using different text representations for the input text sequence 114. For instance, the text representations may include character or phoneme input representations, or hybrids thereof, e.g., as generated by the text encoder 112. Embeddings (e.g., text encodings 115) corresponding to each character or grapheme are generally default inputs for E2E TTS systems, requiring the TTS systems to implicitly learn how to pronounce input words, i.e., grapheme-to-phoneme conversion as part of the speech synthesis task. Extending a grapheme-based input vocabulary to a multilingual setting occurs by simply concatenating grapheme sets in the training corpus for each language. This can grow quickly for languages with large alphabets, e.g. a Mandarin vocabulary contains over 4.5 k tokens. In some implementations, all graphemes appearing in the training corpus are concatenated, leading to a total of 4,619 tokens. Equivalent graphemes are shared across languages. During inference all previously unseen characters may be mapped to a special out-of-vocabulary (OOV) symbol.

In some examples, the text representations are derived from the 8-bit Unicode Transformation Format (UTF-8) that corresponds to a variable width character encoding in multilingual settings capable of encoding all 1,112,064 valid code points in Unicode using one to four one-byte (8-bit) code units. Accordingly, implementations herein may base the representation of the input text sequence 114 on the UTF-8 encoding by using 256 possible values as each input token (e.g., text encoding 115) where the mapping from graphemes to bytes is language-dependent. For languages with single-byte characters, e.g., English, this representation is equivalent to the grapheme representation. However, for languages with multi-byte characters, e.g., Mandarin, the TTS model must learn to attend to a consistent sequence of bytes to correctly generate the corresponding speech. On the other hand, using a UTF-8 byte representation may promote sharing of representations between languages due to the smaller number of input tokens.

On the other hand, phoneme input representations may simplify the speech synthesis task by foregoing the need for the model 100 to learn complicated pronunciation rules for languages such as English. Similar to a grapheme-based model, equivalent phonemes are shared across languages. All possible phoneme symbols are concatenated, for a total of 88 tokens.

For learning to synthesize the Mandarin language, the model 100 may incorporate tone information by learning phoneme-independent embeddings for each of the four possible tones, and broadcast each tone embedding to all phoneme embeddings inside the corresponding syllable. For languages such as English and Spanish, tone embeddings are replaced by stress embeddings which include primary and secondary stresses. A special symbol may denote instances of no tone or stress.

Sparsity in training data, in which some languages may only have training utterances for a few speakers, makes training the multilingual TTS model 100 to produce high quality synthesized speech across different languages challenging. For instance, in an extreme scenario where there is only one speaker per language in the training data, the speaker identify and the language identifier (ID) are essentially the same. In some implementations, the TTS model 100 incorporates the adversarial loss module 107 to employ domain adversarial training for proactively discouraging each text encoding 115 from also capturing speaker information. In these implementations, the adversarial loss module 107 includes a gradient reversal component 109, that receives the text encodings 115 and generates an adversarial loss term 108, and a speaker classifier 110, that produces a speaker label, $s_i$, based on the text encodings 115 and the adversarial loss term 108. Accordingly, the domain adversarial training encourages the model 100 to learn disentangled representations of the text encoding 115 and speaker identity by introducing the gradient reversal component 109 and the speaker classifier 110 for encoding text in a speaker-independent manner.

Note that the speaker classifier is optimized with a different objective than the rest of the model, specifically $L_{speaker}(\psi_s;t_i)=\Sigma_i^N \log p(s_i|t_i)$, where $t_i$ is the text encoding, $s_i$ is the speaker label, and $\psi^s$ are parameters for speaker classifier. To train the full model, the gradient reversal component 109 (e.g., gradient reversal layer) is inserted prior to this speaker classifier 100, which scales the gradient by λ. Optionally, another adversarial layer may inserted on top of the variational audio encoder to encourage it to learn speaker-independent representations.

The adversarial loss module 107 imposes the adversarial loss term 108 separately on each element of the text encodings 115 in order to encourage the TTS model 100 to learn a language-independent speaker embedding 116 space. Thus, the adversarial loss term 108 is introduced on a per-input token basis to enable cross-lingual voice transfer when only one training speaker is available for each language. In contrast to techniques which disentangled speaker identity from background noise, some input tokens (e.g., text encodings 115) are highly language-dependent which can lead to unstable adversarial classifier gradients. Accordingly, implementations herein address this issue by clipping gradients output from the gradient reversal component 109 to limit the impact of such outliers. In some examples, the gradient reversal component 109 applies gradient clipping with factor 0.5.

In some examples, the TTS model 100 is trained using a training set of high qualities speech utterances from multiple speakers in each of three languages: English (EN); Spanish (ES); and Mandarin (CN). In some examples, the training utterances across the three languages is unbalanced. For instance, the English training speech utterances may include 385 hours from 84 professional voice actors with accents from the United States, Great Britain, Australia, and Singapore, while the Spanish training speech utterances only include 97 hours from three female speakers with Castilian and United States-based Spanish accents and the Mandarin training speech utterances include only 68 hours from five speakers.

The decoder neural network 118 may receive, at each decoder step, a concatenation of a 64-dimensional speaker embedding 116 and a 3-dimensional speaker embedding 117. The synthesized speech 150 is represented by a sequence of 128-dimensional log-mel spectrogram frames 119 output from the decoder neural network, which may be computed from 50 millisecond windows shifted by 12.5 milliseconds. Moreover, the variational autoencoder 102 (e.g., residual encoder) may include an architecture mapping a variable length mel spectrogram 104 to two vectors parameterizing the mean and log variance of the Gaussian posterior. The speaker classifier(s) 110 may include fully-connected networks with one 256-unit hidden layer followed by a softmax that predicts the speaker identify. In some examples, the synthesizer 101 and the speaker classifier 110 are trained with weight 1.0 and 0.02, respectively. In some examples, the waveform synthesizer 125 includes the WaveRNN vocoder 125 synthesizing 100 samples per model, whereby each sample is rated by six raters. The use the WaveRNN vocoder 125 allows for producing time-domain waveforms 126 associated with high fidelity audio to limit the amount of variance similarly MOS ratings.

For each language, techniques herein choose one speaker to use for similarity tests. In testing, the English speaker was found to be dissimilar to the Spanish and Mandarin speakers (MOS below 2.0), while the Spanish and Mandarin speakers are slightly similar (MOS around 2.0). The Mandarin speaker has more natural variability compared to English and ES, leading to a lower self-similarity.

The MOS scores are consistent when English and Mandarin raters evaluate the same English and Mandarin test set. Specifically, raters are able to discriminate between speakers across languages. However, when rating synthetic speech, it was observed that English speaking raters often consider "heavy accented" synthetic Mandarin speech to sound more similar to the target English speaker, compared to more fluent speech from the same speaker.

For all three languages (e.g., English, Spanish, and Mandarin), byte-based models use a 256-dimensional softmax output. Monolingual character and phoneme models may each use a different input vocabulary corresponding to the training language. Testing has shown that, for Mandarin, training the TTS model 100 on phoneme-based text encodings performs significantly better than when the TTS model 100 is trained on character0 or byte-based variants due to rare and out-of-vocabulary (OOV) words. For simplicity, word boundary was not added during training. The multi-speaker model performs about the same as the single speaker per-language variant. Overall, when using phoneme inputs all the languages obtain MOS scores above 4.0.

In some implementations, cross-language voice cloning performance of the TTS model 100 evaluates how well the resulting synthesized speech 150 clones a target speaker's voice into a new language by simply passing in speaker embeddings 116*a*, e.g., from speaker embedding component 116, corresponding to a different language from the input text 114. Testing was performed to show voice cloning performance from an English speaker in the most data-poor scenario, where only a single speaker is available for each training language (1EN 1ES 1CN) without using the speaker-adversarial loss 108. Using character or byte text encoding 115 inputs it was possible to clone the English speaker to Spanish with high similarity MOS, albeit with significantly reduced naturalness. However, cloning the English voice to Mandarin failed, as did cloning to Spanish and Mandarin using phoneme inputs. Adding the adversarial speaker classifier enabled cross-language cloning of the English speaker to Mandarin with very high similarity MOS for both byte and phoneme models. The use of phoneme-based text encodings 115 may be used to guarantee that pronunciations are correct and result in more fluent speech.

Incorporating the adversarial loss term 108 forces the text representation 114 to be less language-specific, instead relying on the language embedding 117*a*, e.g., from language embedding component 117, to capture language-dependent information. Across all language pairs, the model 100 is able to synthesize speech 150 in all voices with naturalness MOS around 3.9 or higher.

The high naturalness and similarity MOS scores indicate that the model is able to successfully transfer the English voice to both Spanish and Mandarin almost without accent. When consistently conditioning on the English language embedding regardless of the target language, the model produces more English accented Spanish and Mandarin speech, which leads to lower naturalness but higher similarity MOS scores Finally, testing has demonstrated the importance of training using a variational residual encoder 102 to stabilize the model output. Naturalness MOS decreases by 0.4 points for EN-to-CN cloning without the residual encoder 102. In comparisons of the outputs of the two models the techniques described by this specification have shown that the model without the residual encoder 102 tends to skip rare words or inserts unnatural pauses in the output speech. This indicates the VAE prior learns a mode which helps stabilize attention.

Figure 3:
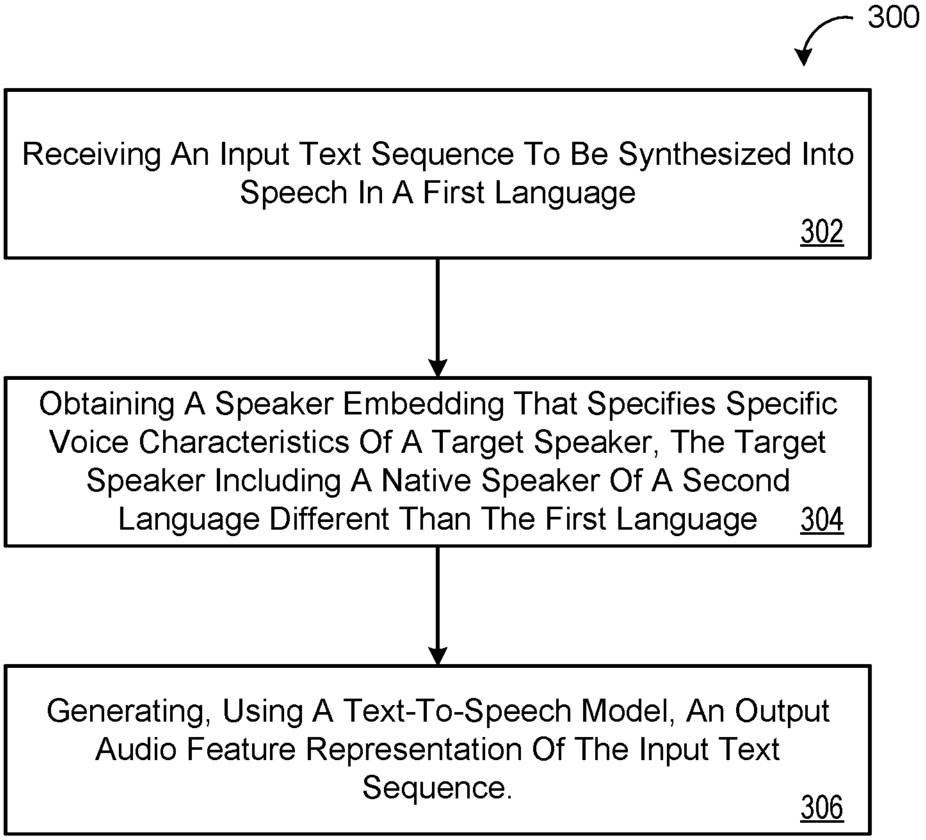
FIG. 3 is an example arrangement of operations for a method of producing synthesized speech from an input text sequence.

FIG. 3 illustrates a flowchart of an example arrangement of operations for a method 300 of synthesizing speech that clones a voice of a target speaker 10. At operation 302, the method 300 includes receiving, at data processing hardware 121, an input text sequence 114 to be synthesized into speech 150 in a first language. For instance, the first language may include Spanish. The input text sequence 114 may correspond to a character input representation (e.g., graphemes), a phoneme input representation, or a hybrid representation including a combination of characters and phonemes. In some other examples, the text input sequence 114 includes an 8-bit Unicode Transformation Format (UTF-8) encoding sequence.

At operation 304, the method 300 includes obtaining, at the data processing hardware 121, a speaker embedding 116*a* that specifies voice characteristics of the target speaker 10 for synthesizing the input text sequence 114 into speech 150 that clones the voice of the target speaker 10. The target speaker 10 includes a native speaker of a second language different than the first language. For instance, the target speaker 10 may speak English as a native language. Moreover, the first language may be foreign to the target speaker 10 such that the target speaker 10 is unable to speak or understand the first language. The speaker embedding 116*a* may be associated with the speaker. The speaker embedding 116*a* may be learned during training of a text-to-speech (TTS) model 100 based on training utterances spoken by the target speaker in the second language (e.g., English). In some implementations, the TTS model 100 incorporates an adversarial loss module 107 to employ domain adversarial training for proactively discouraging text encoding 115 corresponding to the training utterances from also capturing speaker information. In these implementations, the adversarial loss module 107 includes a gradient reversal component 109, that receives the text encodings 115 and generates an adversarial loss term 108, and a speaker classifier 110, that produces a speaker label, $s_i$, based on the text encodings 115 and the adversarial loss term 108.

At operation 306, the method also includes generating, by the data processing hardware 121, using the TTS model 100, an output audio feature representation 118 of the input text sequence 114 by processing the input text sequence 114 and the speaker embedding 116*a*. The output audio feature representation 118 has the voice characteristics of the target speaker 10 specified by the speaker embedding 116*a*.

The method 300 may further obtain a language embedding 117*a* that specifies language-dependent information, and process the language embedding 117*a* while processing the input text sequence 114 and the speaker embedding 116*a* to generate the output audio feature representation 118. In some examples, the language-dependent information is associated with the second language of the target speaker, and the language embedding 117*a* specifying the language-dependent information is obtained from training utterances spoken in the second language by one or more different speakers. In other examples, the language-dependent information is associated with the first language, and the language embedding 117*a* specifying the language-dependent information is obtained from training utterances spoken in the first language by one or more different speakers A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
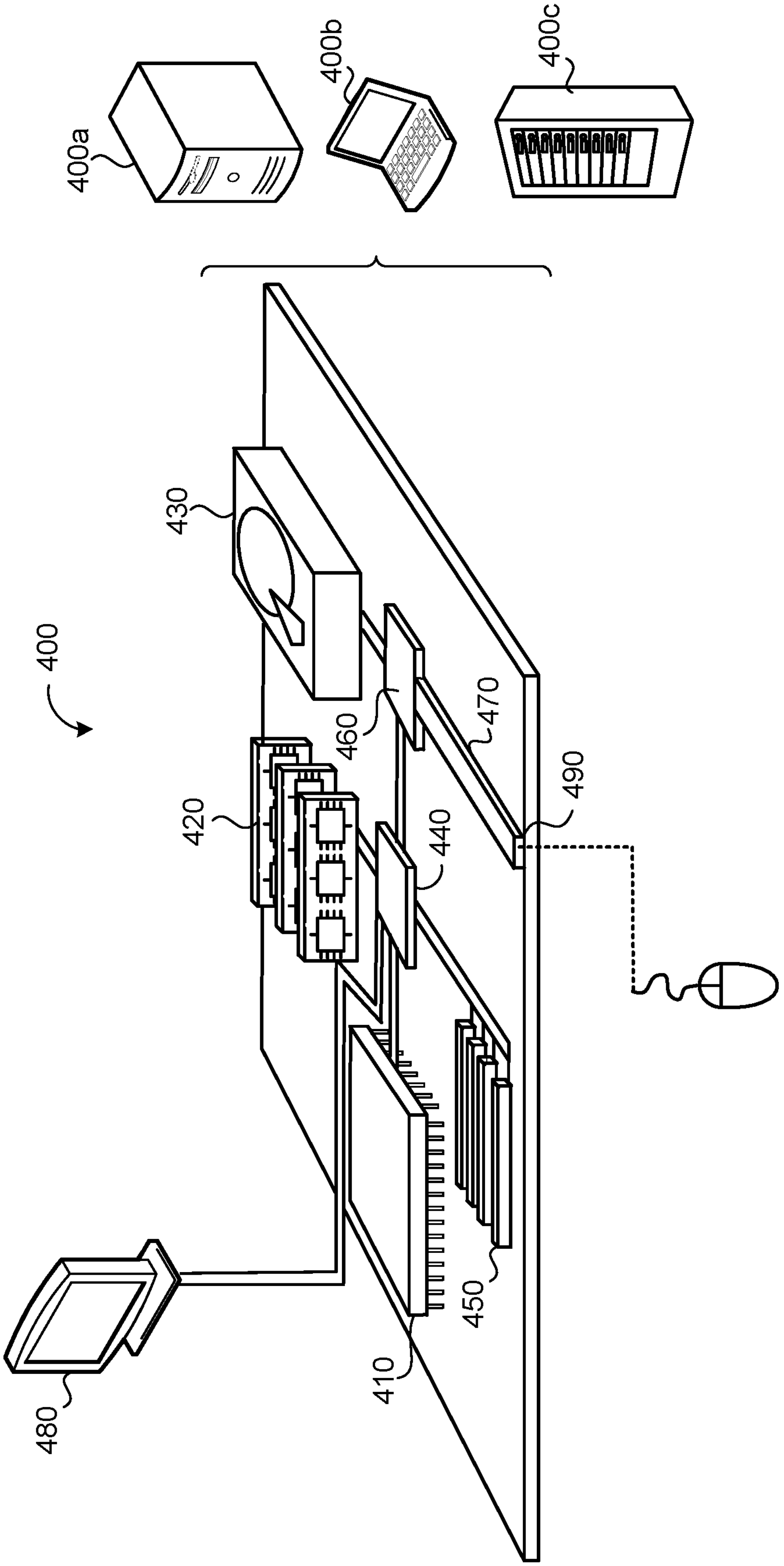
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving an input text sequence in a first language;

obtaining a speaker embedding specifying specific voice characteristics of a target speaker for synthesizing the input text sequence into speech that clones a voice of the target speaker; and processing, using a multilingual text-to-speech (TTS) model configured to receive the speaker embedding and the input text sequence in the first language as input, the speaker embedding and the input text sequence in the first language to generate an output audio feature representation as output from the multilingual TTS model, the output audio feature representation representing synthesized speech that clones the voice of the target speaker in a second language different than the first language.

2. The computer-implemented method of claim 1, wherein the operations further comprise:

obtaining a language embedding specifying language-dependent information, wherein processing the speaker embedding and the input text sequence further comprises processing the input text sequence in the first language, the speaker embedding, and the language embedding to generate the output audio feature representation as output from the multilingual TTS model, the output audio feature representation further having the language-dependent information specified by the language embedding.

3. The computer-implemented method of claim 2, wherein:

the language-dependent information is associated with the second language of the target speaker; and the language embedding specifying the language-dependent information is obtained from training utterances spoken in the second language by one or more different speakers.

4. The computer-implemented method of claim 2, wherein:

the language-dependent information is associated with the first language; and the language embedding specifying the language-dependent information is obtained from training utterances spoken in the first language by one or more different speakers.

5. The computer-implemented method of claim 1, wherein processing the speaker embedding and the input text sequence in the first language to generate the output audio feature representation as output from the multilingual TTS model comprises, for each of a plurality of time steps:

processing, using an encoder neural network, a respective portion of the input text sequence for the time step to generate a corresponding text encoding for the time step; and processing, using a decoder neural network, the text encoding for the time step to generate a corresponding output audio feature representation for the time step.

6. The computer-implemented method of claim 1, wherein the output audio feature representation comprises mel-frequency spectrograms.

7. The computer-implemented method of claim 1, wherein the operations further comprise:

inverting, using a waveform synthesizer, the output audio feature representation into a time-domain waveform; and generating, using the time-domain waveform, a synthesized speech representation of the input text sequence that clones the voice of the target speaker in the second language.

8. The computer-implemented method of claim 1, wherein the multilingual TTS model is trained on:

a first language training set comprising a plurality of utterances spoken in the first language and corresponding reference text; and a second language training set comprising a plurality of utterances spoken in the second language and corresponding reference text.

9. The computer-implemented method of claim 1, wherein the input text sequence corresponds to a character input representation.

10. The computer-implemented method of claim 1, wherein the input text sequence corresponds to a phoneme input representation.

11. The computer-implemented method of claim 1, wherein the input text sequence corresponds to an 8-bit Unicode Transformation Format (UTF-8) encoding sequence.

12. A system comprising:

data processing hardware; and memory hardware in communication with the data processing hardware, the memory hardware storing instructions that when executed on the data processing hardware cause the data processing hardware to perform operations comprising:

receiving an input text sequence in a first language;

obtaining a speaker embedding specifying specific voice characteristics of a target speaker for synthesizing the input text sequence into speech that clones a voice of the target speaker; and processing, using a multilingual text-to-speech (TTS) model configured to receive the speaker embedding and the input text sequence in the first language as input, the speaker embedding and the input text sequence in the first language to generate an output audio feature representation as output from the multilingual TTS model, the output audio feature representation representing synthesized speech that clones the voice of the target speaker in a second language different than the first language.

13. The system of claim 12, wherein the operations further comprise:

obtaining a language embedding specifying language-dependent information, wherein processing the speaker embedding and the input text sequence further comprises processing the input text sequence in the first language, the speaker embedding, and the language embedding to generate the output audio feature representation as output from the multilingual TTS model, the output audio feature representation further having the language-dependent information specified by the language embedding.

14. The system of claim 13, wherein:

the language-dependent information is associated with the second language of the target speaker; and the language embedding specifying the language-dependent information is obtained from training utterances spoken in the second language by one or more different speakers.

15. The system of claim 13, wherein:

the language-dependent information is associated with the first language; and the language embedding specifying the language-dependent information is obtained from training utterances spoken in the first language by one or more different speakers.

16. The system of claim 12, wherein processing the speaker embedding and the input text sequence in the first language to generate the output audio feature representation as output from the multilingual TTS model comprises, for each of a plurality of time steps:

processing, using an encoder neural network, a respective portion of the input text sequence for the time step to generate a corresponding text encoding for the time step; and processing, using a decoder neural network, the text encoding for the time step to generate a corresponding output audio feature representation for the time step.

17. The system of claim 12, wherein the output audio feature representation comprises mel-frequency spectrograms.

18. The system of claim 12, wherein the operations further comprise:

inverting, using a waveform synthesizer, the output audio feature representation into a time-domain waveform; and generating, using the time-domain waveform, a synthesized speech representation of the input text sequence that clones the voice of the target speaker in the second language.

19. The system of claim 12, wherein the multilingual TTS model is trained on:

a first language training set comprising a plurality of utterances spoken in the first language and corresponding reference text; and a second language training set comprising a plurality of utterances spoken in the second language and corresponding reference text.

20. The system of claim 12, wherein the input text sequence corresponds to a character input representation.

21. The system of claim 12, wherein the input text sequence corresponds to a phoneme input representation.

22. The system of claim 12, wherein the input text sequence corresponds to an 8-bit Unicode Transformation Format (UTF-8) encoding sequence.

* * * * *